(12) United States Patent
Hine

(10) Patent No.: US 7,936,506 B2
(45) Date of Patent: May 3, 2011

(54) SYSTEM AND METHOD FOR DISPLAYING IMAGES

(75) Inventor: Matthew Glen Hine, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 832 days.

(21) Appl. No.: 11/708,436

(22) Filed: Feb. 20, 2007

(65) Prior Publication Data

US 2008/0198623 A1 Aug. 21, 2008

(51) Int. Cl.
*G03B 21/60* (2006.01)
(52) U.S. Cl. .......................................... 359/457; 359/460
(58) Field of Classification Search .................. 359/455, 359/456, 457, 460
See application file for complete search history.

(56) References Cited

U.S. PATENT DOCUMENTS

| | | | |
|---|---|---|---|
| 4,701,020 A | | 10/1987 | Bradley, Jr. |
| 5,048,949 A | | 9/1991 | Sato et al. |
| 5,085,495 A | * | 2/1992 | Iwahara et al. ............... 359/455 |
| 5,206,761 A | * | 4/1993 | Ogino ........................... 359/457 |
| 5,477,380 A | * | 12/1995 | Watanabe et al. ............. 359/457 |
| 5,513,037 A | | 4/1996 | Yoshida et al. |
| 6,437,914 B1 | * | 8/2002 | Hall et al. ...................... 359/457 |
| 6,808,271 B1 | * | 10/2004 | Kurematsu ...................... 353/70 |
| 6,857,750 B2 | | 2/2005 | Shimizu |
| 2004/0169921 A1 | | 9/2004 | Suzuki et al. |
| 2005/0280784 A1 | | 12/2005 | Katase et al. |
| 2007/0253058 A1 | | 11/2007 | Wood |

* cited by examiner

*Primary Examiner* — Christopher Mahoney
(74) *Attorney, Agent, or Firm* — Charles A. Brill; Wade James Brady, III; Frederick J Telecky, Jr.

(57) ABSTRACT

System and method for projection display with slim cabinet depth. An embodiment comprises a collimating layer positioned in a light path of a display plane, and a diffusion layer positioned in the light path of the display plane after the collimating layer. The diffusion layer increases the viewing angle of the display plane. The collimating layer comprises a first lens having first and second axes orthogonal to each other and to the light path and a second lens positioned in the light path after the first lens, the second lens having first and second axes orthogonal to each other and to the light path. The first lens is configured along its first axis to redirect light towards the light path and the second lens is configured along its first and second axes to redirect light towards the light path so that the light is substantially parallel to the light path.

20 Claims, 7 Drawing Sheets

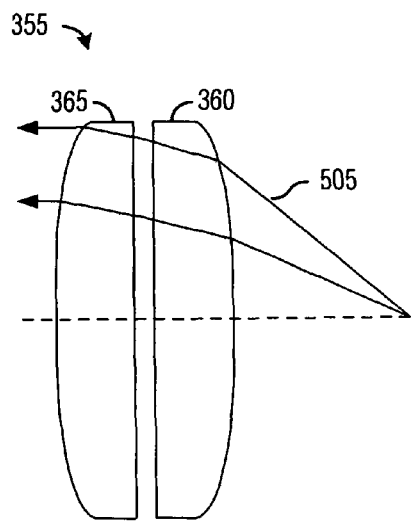
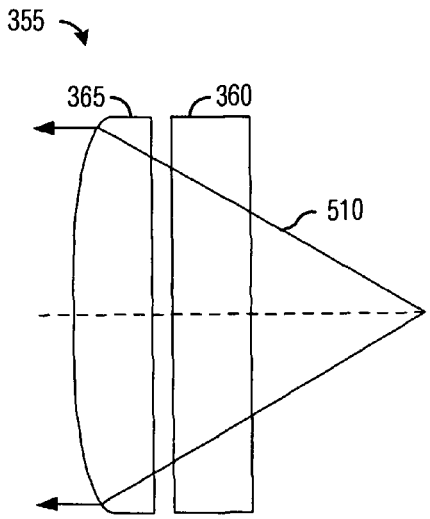
*Fig. 5a*
*Fig. 5b*
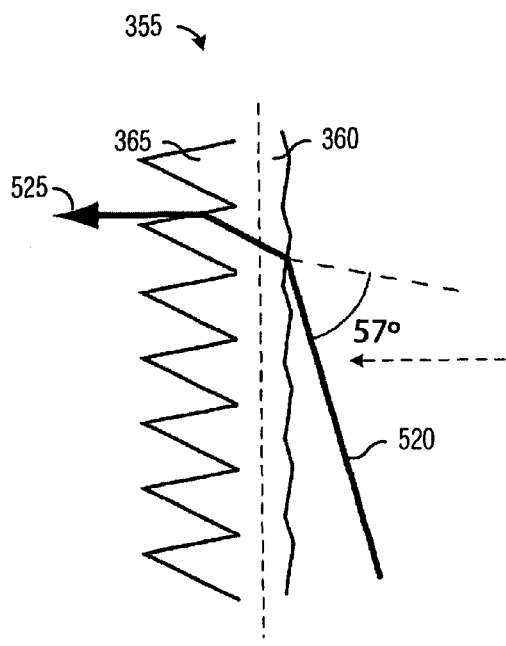
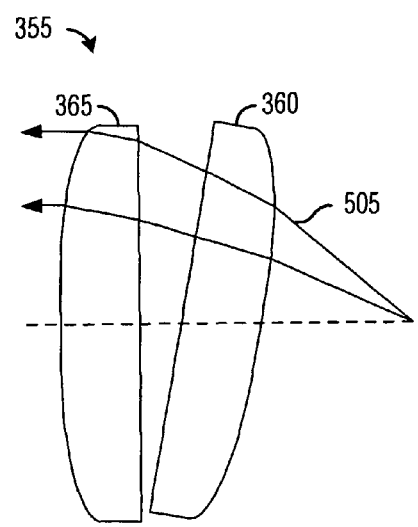
*Fig. 5c*
*Fig. 5d*

SYSTEM AND METHOD FOR DISPLAYING IMAGES

TECHNICAL FIELD

The present invention relates generally to a system and method for displaying images, and more particularly to a system and method for projection display with slim cabinet depth.

BACKGROUND

Microdisplay-based projection display systems have been able to provide consumers with high image quality and large image size at an affordable price. However, when compared to flat-panel display systems, such as liquid crystal display systems and plasma display systems, the microdisplay-based projection display systems may have noticeably thicker system cabinets. For some consumers, the thicker system cabinets may outweigh the larger screen size and the significantly lower price. Therefore, manufacturers of microdisplay-based projection display systems strive to design display systems that are thinner than what is currently available.

A microdisplay-based projection display system utilizing a digital micromirror device (DMD) may include one or more fold mirrors in its system cabinet, for example. The fold mirror can decrease the system cabinet depth by folding the light path of the DMD-based projection display system. By folding the light path, a virtual distance traversed by a light beam may be maintained while a physical distance traversed may be shortened. A light produced by a light source of the DMD-based projection display system may be modulated by micromirrors in the DMD. An individual micromirror may be in one of two states dependent on image data of an image being displayed. The micromirror may be in a state (position) that reflects the light onto a display plane or away from the display plane. A single fold mirror may be able to reduce the depth of the system cabinet by approximately one-half, while two fold mirrors may be able to reduce the depth of the system cabinet by about two-thirds, and so on.

SUMMARY OF THE INVENTION

These and other problems are generally solved or circumvented, and technical advantages are generally achieved, by embodiments of a system and a method for projection display with slim cabinet depth.

In accordance with an embodiment, a display plane is provided. The display plane includes a collimating layer in a light path of the display plane, and a diffusion layer positioned in the light path of the display plane after the collimating layer. The diffusion layer increases a viewing angle of the display plane. The collimating layer includes a first lens having first and second axes orthogonal to each other and to a light path of the display plane, wherein the first lens, along its first axis, redirects light towards the light path of the display plane, and a second lens positioned in the light path after the first lens, the second lens having first and second axes orthogonal to each other and to the light path of the display plane, wherein the second lens, along its first and second axes, redirects light towards the light path of the display plane so that the light is substantially parallel to the light path of the display plane.

In accordance with an embodiment, a display system is provided. The display system includes a light source to produce light, an array of light modulators optically coupled to the light source and positioned in a light path of the display system after the light source, a display plane positioned in the light path of the display system after the array of light modulators, and a controller electronically coupled to the array of light modulators and to the light source. The array of light modulators produces images by modulating light from the light source based on image data, and the controller loads image data into the array of light modulators. The display plane displays the images produced by the array of light modulators, the display plane including a collimating layer position in a light path of the display plane, and a diffusion layer positioned in the light path of the display system after the collimating layer. The diffusion layer increases a viewing angle of the display plane. The collimating layer includes a first refractive lens to bend light along a first first axis towards the light path of the display system, and a second refractive lens positioned in the light path of the display system after the first refractive lens, the second lens to bend light along a second first axis and a second second axis so that the light is substantially parallel to the light path of the display system.

In accordance with another embodiment, a method of manufacturing a display system is provided. The method includes installing a light source configured to generate light, installing an array of light modulators in the light path, installing a controller configured to control the light source and the array of light modulators, and installing a display plane in the light path. The display plane installing includes installing a first refracting lens, installing a second refracting lens adjacent to the first refracting lens, and installing a diffusion layer adjacent to the second refracting lens on a side opposite the first refracting lens.

An advantage of an embodiment is that small system cabinet depth microdisplay-based projection display systems normally requiring Fresnel lenses with a high maximum angle of incidence may be built without using the expensive Fresnel lenses with a high maximum angle of incidence. This may reduce the overall cost of the microdisplay-based projection display systems while enabling the construction of a thin display system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIGS. 5a through 5d are diagrams of the operation of a collimating layer;

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a DMD-based projection display system. The invention may also be applied, however, to other microdisplay-based projection display systems, such as those utilizing transmissive or reflective liquid crystal displays, liquid crystal on silicon, ferroelectric liquid crystal on silicon, deformable micromirrors, and so forth. Furthermore, non-microdisplay-based projection display systems, such as CRT-based projection display systems, may also make use of the invention.

Figure 1A:
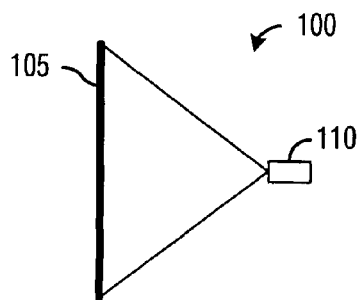
FIGS. 1a through 1c are diagrams of a simplified microdisplay-based projection display system, a plot of typical angles of incidence at a display plane of the microdisplay-based projection display system, and a detailed view of a light beam incident on a Fresnel lens of the microdisplay-based projection display system.
Figure 1B:
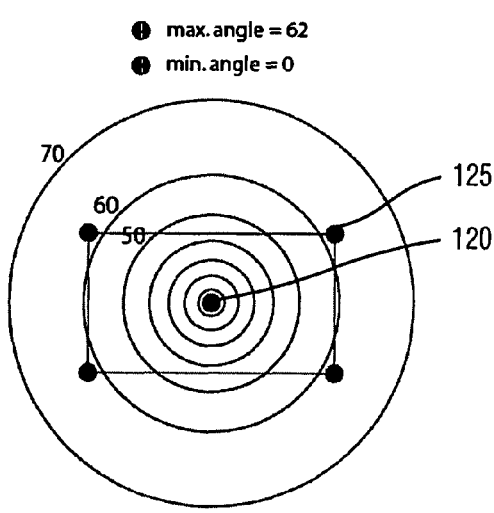
Figure 1C:
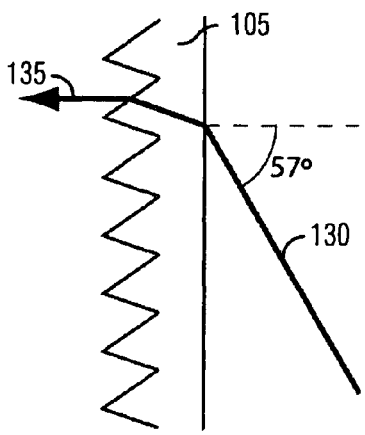

With reference now to FIGS. 1a through 1c, there are shown diagrams illustrating a simplified view of an optical system of a microdisplay-based projection display system 100. Also shown are diagrams illustrating a plot of typical angles of incidence at a display plane of the microdisplay-based projection display system, and a detailed view of a light beam incident on a Fresnel lens of the microdisplay-based projection display system. The diagram shown in FIG. 1a illustrates a simplified view of an optical system including a display plane 105 and a projection engine 110. The optical system, as shown, may have no offset, meaning that an optical center of the projection engine 110 coincides with the center of the display plane 105 when the projection engine 110 is centered with respect to the display plane 105.

The display plane 105 may include two optical layers. A first optical layer (a collimating layer) may be used to bend (refract) light incident to the display plane 105 to make the light parallel to a light path of the microdisplay-based projection display system 100. An example of the first optical layer may be a Fresnel lens. A Fresnel lens may be specified by its range of angles of incidence and its maximum angle of incidence. Typically, a Fresnel lens with a large maximum angle of incidence may be significantly more expensive than a Fresnel lens with a smaller maximum angle of incidence. A second optical layer (a diffusing layer) of the display plane 105 may be used to increase the viewing angle of the microdisplay-based projection display system 100, with a lenticular layer being one example.

With the projection engine 110 directly behind and centered on the display plane 105, a plot of typical angles of incidence at the display plane 105 (more precisely, a plot of typical angles of incidence at the first optical layer of the display plane 105) may vary from a minimum of zero degrees (at the center of the display plane 105) to a maximum occurring at the corners of the edges of the display plane 105. The diagram shown in FIG. 1b illustrates a plot of angles of incidence for the optical system shown in FIG. 1a. The range of angles of incidence for the optical system of the projection display system 100 ranges from zero degrees (point 120) to about 62 degrees (point 125).

The diagram shown in FIG. 1c illustrates a light beam 130 incident on a surface (the first optical layer of the display plane 105) of the display plane 105 at an angle of incidence of about 57 degrees. With the angle of incidence being within the range of angles of incidence of the display plane 105 of the projection display system 100, the entirety of the light beam 130 may enter the display plane 105 and be bent to produce an output light beam 135 that is orthogonal to the surface of the display plane 105.

Figure 2A:
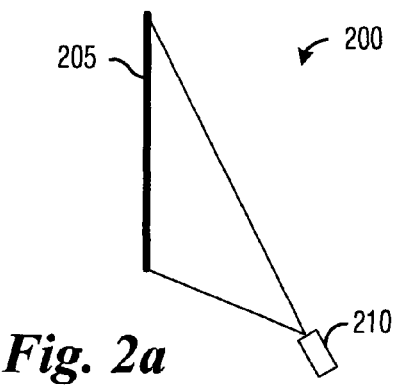
FIGS. 2a through 2c are diagrams of a simplified microdisplay-based projection display system, a plot of typical angles of incidence at a display plane of the microdisplay-based projection display system, and a detailed view of a light beam incident on a Fresnel lens of the microdisplay-based projection display system, wherein the microdisplay-based projection display system makes use of high angles of incidence to reduce system cabinet depth.
Figure 2B:
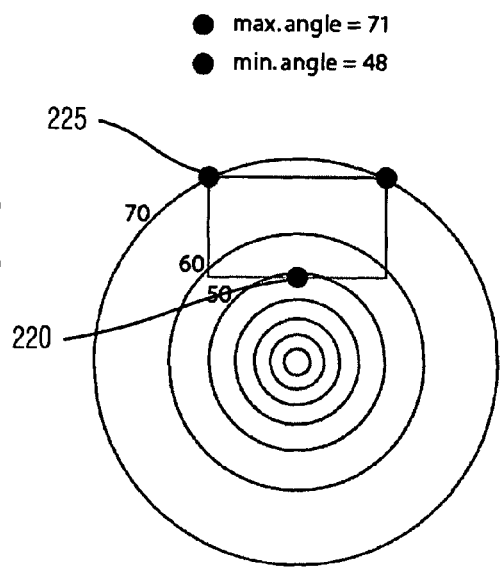
Figure 2C:
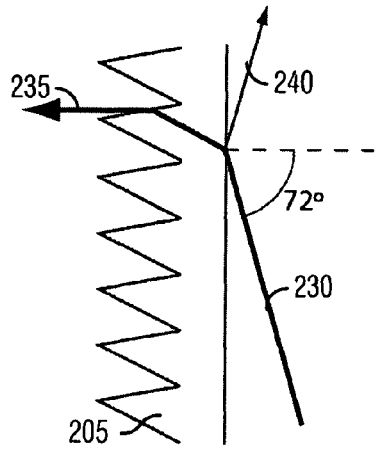

With reference now to FIGS. 2a through 2c, there are shown diagrams illustrating a simplified view of an optical system of a microdisplay-based projection display system 200. Also shown are diagrams illustrating a plot of typical angles of incidence at a display plane of the microdisplay-based projection display system, and a detailed view of a light beam incident on a Fresnel lens of the microdisplay-based projection display system. The diagram shown in FIG. 2a illustrates a simplified view of an optical system of the projection display system 200 including a display plane 205 and a projection engine 210. The optical system, as shown, may have a significant optical offset, meaning that an optical center of the projection engine 210 does not coincide with the center of the display plane 205.

With the projection engine 210 positioned behind the display plane 205 and set so that the light projected covers the display plane 205, a plot of typical angles of incidence at the display plane 205 may vary from a minimum occurring at an edge of the display plane 205 closest to the projection engine 210 to a maximum occurring at the corners of the display plane 205 furthest from the projection engine 210. The diagram shown in FIG. 2b illustrates a plot of angles of incidence for the optical system shown in FIG. 2a. The range of angles of incidence ranges from about 48 degrees (at point 220) to about 71 degrees (at point 225).

The diagram shown in FIG. 2c illustrates a light beam 230 incident on a surface of the display plane 205 at an angle of incidence of about 72 degrees. With the angle of incidence being greater than the maximum angle of incidence of the display plane 205, a portion of the light beam 230 may enter the display plane 205 and be bent to produce an output light beam 235 that is orthogonal to the surface of the display plane 105. A portion of the light beam 230 may reflect off the surface of the display plane 205 (reflected light beam 240), potentially resulting in a dimmer image, decreased contrast ratio, lower image quality, and so forth.

Figure 3A:
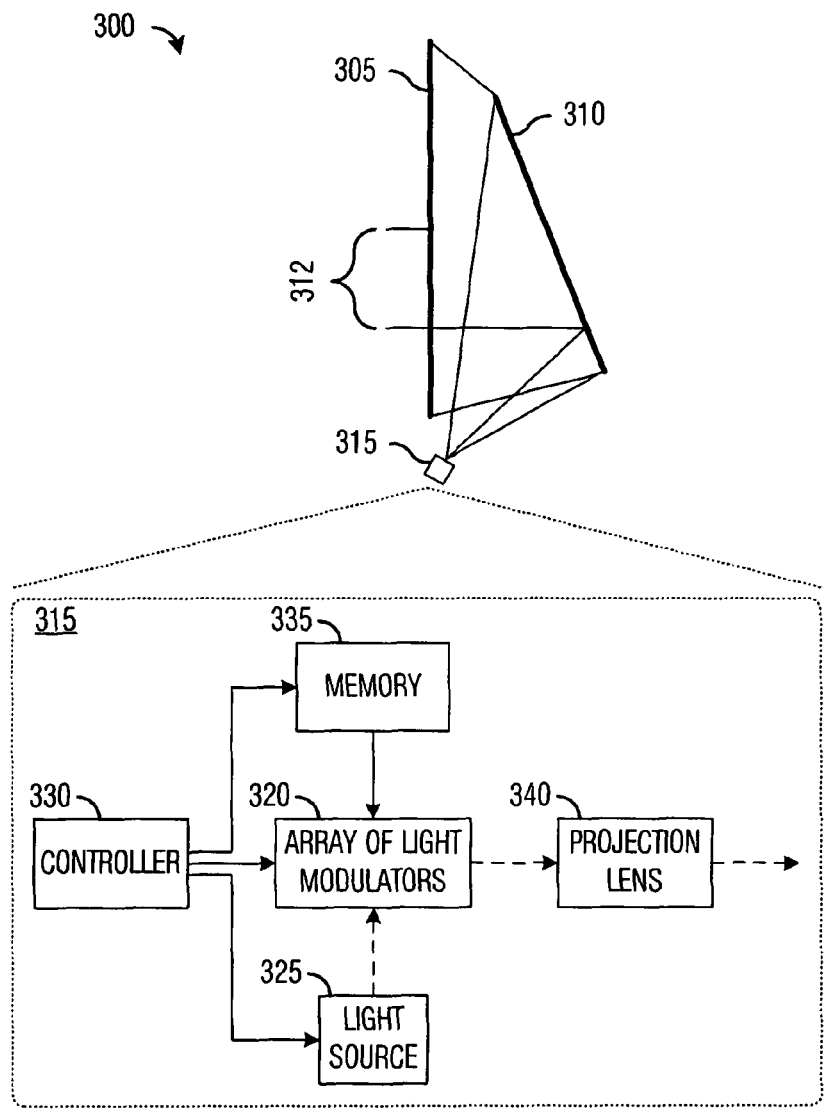
FIGS. 3a and 3b are diagrams of an exemplary microdisplay-based projection display system and a portion of its display plane.
Figure 3B:
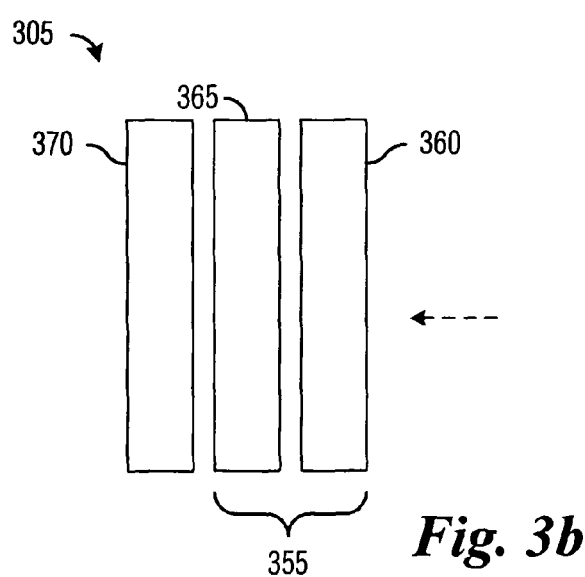

With reference now to FIGS. 3a and 3b, there are shown diagrams illustrating an exemplary microdisplay-based projection display system 300 and a detailed view of a portion of a display plane. The microdisplay-based projection display system 300 includes a display plane 305, a fold mirror 310, and a projection engine 315. The projection engine 315 has an optical offset, shown as span 312 (a difference between an optical center of images projected by the projection engine 315 and the center of the display plane 305).

The projection engine 315 includes a DMD 320 (a form of microdisplay made up of an array of light modulators) that modulates light produced by a light source 325. Other examples of microdisplays may include transmissive or reflective liquid crystal, liquid crystal on silicon, ferroelectric liquid crystal on silicon, deformable micromirrors, and so forth. In a microdisplay, the array of light modulators may be arranged in a rectangular, square, diamond shaped, and so forth, array. Each light modulator in the microdisplay may operate in conjunction with the other light modulators to modulate the light produced by the light source 325. The light, modulated by the DMD 320, may be used to create images on the display plane 305. The DMD 320 and the light source 325 may be controlled by a controller 330, which may be used to load image data into the DMD 320, instruct the DMD 320 to change state, control the light produced by the light source 325, and so forth. A memory 335 may store the image data along with configuration information, color correction data, and so forth. The projection engine 315 also includes a projection lens 340 with an optical offset.

It may be possible to replace a collimating layer of the display plane 105 comprising a single Fresnel lens having a large maximum angle of incidence with multiple Fresnel lenses, each with a smaller maximum angle of incidence. For example, two Fresnel lenses, each with a smaller maximum angle of incidence, may be used in place of a single Fresnel lens with a large maximum angle of incidence. A Fresnel lens with a large maximum angle of incidence, for example, greater than about 55 to 60 degrees, may need to be total internal reflection (TIR) type lenses. While a Fresnel lens with a smaller maximum angle of incidence, for example, less than about 60 degrees, may be created using a refractive type lens. TIR Fresnel lenses may be more expensive than refractive Fresnel lens since the refractive Fresnel lens may be created using low-cost molding and extrusion techniques. The diagram shown in FIG. 3b illustrates a side view of a portion of the display plane 305, wherein a collimating layer 355 comprises a first Fresnel lens 360 and a second Fresnel lens 365. The display plane 305 also includes a diffusion layer 370.

The second Fresnel lens 365 may be a standard Fresnel lens, i.e., a flattened spherical (or aspherical) lens with a specified range of angles of incidence. The first Fresnel lens 360 may be a lens that has power in one of the two axes orthogonal to the light path of the display plane 305 (shown as a dashed, arrowed line). Additionally, the two axes are orthogonal to each other. For example, the first Fresnel lens 360 may have power in the vertical axis orthogonal to the light path and no power in the horizontal axis orthogonal to the light path. This configuration of the first Fresnel lens 360 may be useful in a microdisplay-based projection display system with a rectangular display plane where the display plane is shorter than it is wide, i.e., a typical standard format or widescreen format display. An example of the first Fresnel lens 360 may be a flattened cylindrical lens. Alternatively, the first Fresnel lens 360 may have more power in the vertical axis orthogonal to the light path than in the horizontal axis orthogonal to the light path. An example of this type of Fresnel lens may be an oval Fresnel lens or other eccentric Fresnel lenses, wherein an eccentric Fresnel lens features a profile that is not radially symmetric. The diagrams shown in FIGS. 4a and 4b illustrate a non-flattened (i.e., spherical (or aspherical)) rendition of an exemplary first Fresnel lens 360 (FIG. 4a) with a concave lens surface and a flattened rendition of an exemplary first Fresnel lens 360 (FIG. 4b).

Figure 4A:
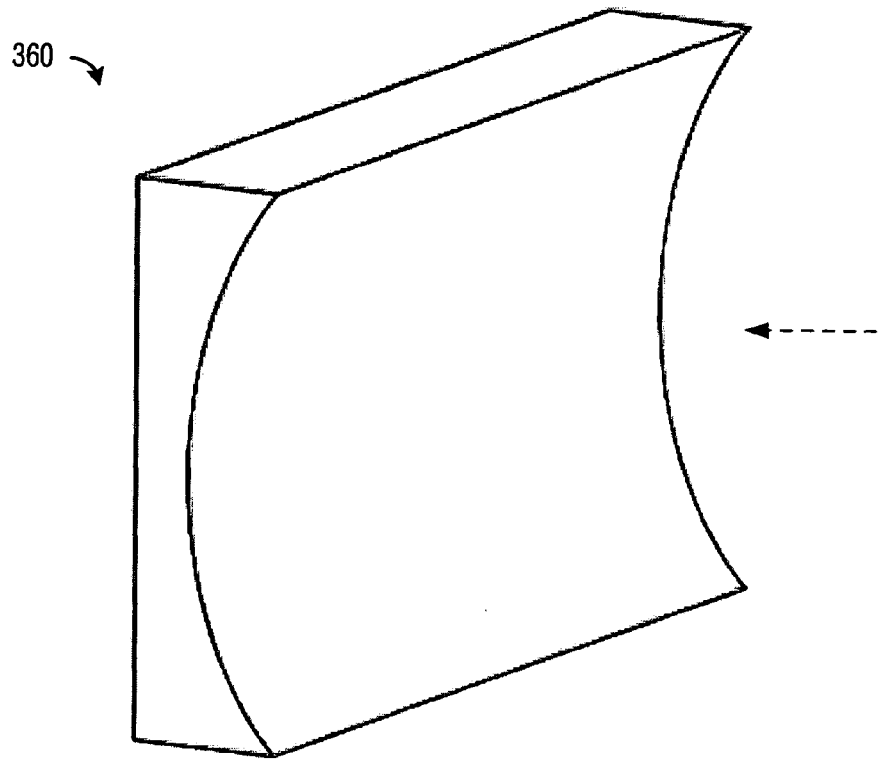
FIGS. 4a and 4b are diagrams of exemplary lenses with more power along a first axis than along a second axis.
Figure 4B:
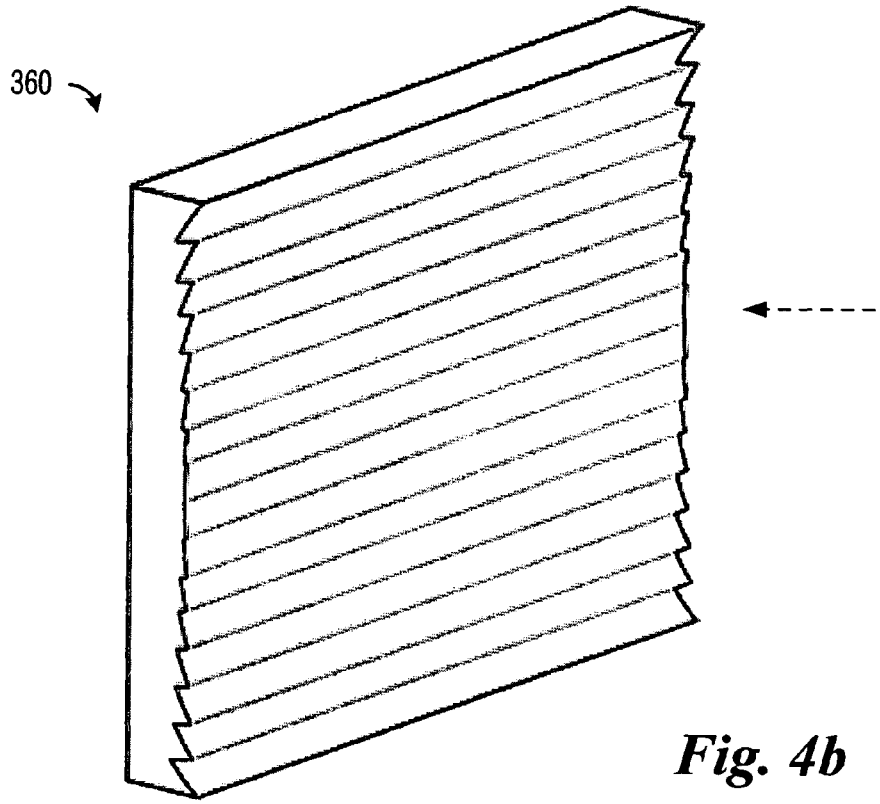

Although shown in FIG. 4a as having a concave lens surface, an alternative lens may have a convex lens surface. Additionally, while the lenses shown in FIGS. 4a and 4b have power in a vertical axis, alternative lenses may have power in a horizontal axis. Furthermore, the lenses are shown configured so that light from the microdisplay is incident on the powered lens surface, whereas alternative lenses may be configured so that the light from the microdisplay will pass through the lenses before reaching the powered lens surface.

With reference now to FIGS. 5a through 5d, there are shown diagrams illustrating the operation of the collimating layer 355. As discussed previously, the collimating layer 355 may be implemented utilizing two lenses, each with a smaller maximum angle of incidence, rather than a single lens with a larger maximum angle of incidence.

The diagram shown in FIG. 5a illustrates a side view of a light beam 505 as it passes through the first Fresnel lens 360 and the second Fresnel lens 365. As the light beam 505 strikes the first Fresnel lens 360, the light beam 505 may be bent toward the light path of the collimating layer 355 (shown as a dashed line). However, since the first Fresnel lens 360 may be underpowered, the light beam 505 may not be sufficiently bent so that it is substantially parallel to the light path of the collimating layer. Then, as the light beam 505 passes through the second Fresnel lens 365, the light beam 505 may be bent further towards the light path of the collimating layer 355. The combination of the first Fresnel lens 360 and the second Fresnel lens 365 may provide adequate power to change the path of the light beam 505 so that it is substantially parallel to the light path of the collimating layer 355. The Fresnel lenses shown in FIGS. 5a and 5b are illustrated using their spherical (or aspherical) equivalents to simplify the drawings. The illustrations of only Fresnel lenses should not be construed as being limiting to either the scope or the spirit of the present invention, since non-Fresnel lenses (for example, spherical or aspherical lenses that are not flattened) may be used in place of the Fresnel lenses.

The diagram shown in FIG. 5b illustrates a top view of a light beam 510 as it passes through the first Fresnel lens 360 and the second Fresnel lens 365. As the light beam 510 strikes the first Fresnel lens 360, the light beam 510 may be substantially unaffected since the first Fresnel lens 360 may have no (or not much) power in the horizontal axis. Then, as the light beam 510 passes through the second Fresnel lens 365, the light beam 510 may be bent towards the light path of the collimating layer 355, making the path of the light beam 510 substantially parallel to the light path of the collimating layer 355.

The diagram shown in FIG. 5c illustrates a side view of a light beam 520 as it passes through the collimating layer 355. The light beam 520 is incident on a first surface of the collimating layer 355 with an angle of about 72 degrees. However, due to the grooved pattern of the first Fresnel layer 360, the light beam 520 may be incident on the surface of the first Fresnel lens 360 with an angle of about 57 degrees. This may be less than the maximum angle of incidence of the first Fresnel lens 360, so that generally all of the light beam 520 enters the first Fresnel lens 360. The light beam 520 may then be bent towards the light path of the collimating layer 355. However, the bending may not be adequate to make the light beam parallel to the light path (shown as dashed, arrowed line) of the collimating layer 355. Then, as the light beam 520 exits the second Fresnel lens 365, the light beam 520 may further be bent towards the light path of the collimating layer 355, producing an output light beam 525 that may substantially parallel to the light path of the collimating layer 355.

Although the combination of the first Fresnel lens 360 and the second Fresnel lens 365 may have adequate power to bend a light beam so that it becomes substantially parallel to the light path of the collimating layer 355, the maximum angle of incidence of the first Fresnel lens 360 may not be adequate to fully accept light from a microdisplay-based projection display system at its maximum angle of incidence without some reflection. However, it may be possible to adjust the first Fresnel lens 360 so that it will be able to accept light from the microdisplay-based projection display system without reflection. The use of two lenses may enable the independent orientation of the two lenses to help facilitate the acceptance of a light beam with a maximum angle of incidence that may be larger than the maximum angle of incidence of the first Fresnel lens 360.

The first Fresnel lens 360 may be tilted (mounted in a microdisplay-based projection display system with a tilt). The diagram shown in FIG. 5d illustrates the collimating layer 355 wherein the first Fresnel lens 360 is mounted in a microdisplay-based projection display system with a tilt. Alternatively, the first Fresnel lens 360 may be formed with a built-in tilt. The tilting of the first Fresnel lens 360 (either mounted with a tilt or with a built-in tilt) may alter the angle of incidence so that a light beam incident to the first Fresnel lens 360 with an angle about equal to the microdisplay-based projection display system's maximum angle of incidence is now less than or equal to the first Fresnel lens's maximum angle of incidence. The power of the first Fresnel lens 360 should be set so that a light beam exiting the first Fresnel lens 360 and incident to the second Fresnel lens 365 is less than or equal to the second Fresnel lens's maximum angle of incidence.

Figure 6A:
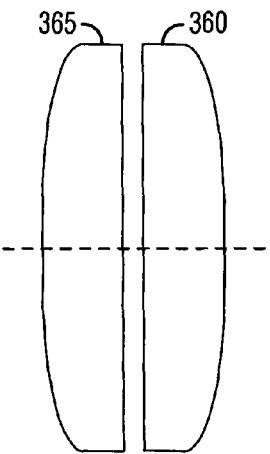
FIGS. 6a through 6n are diagrams of embodiments of the collimating layer.
Figure 6B:
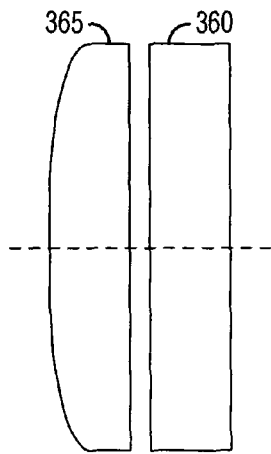
Figure 6C:
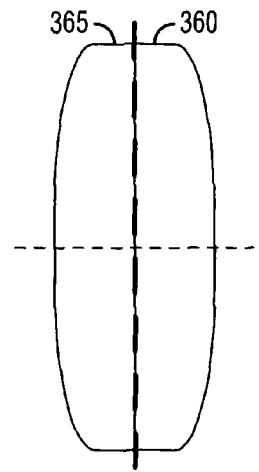
Figure 6D:
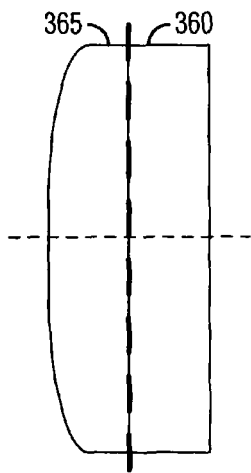
Figure 6E:
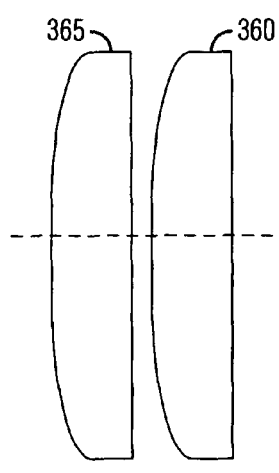
Figure 6F:
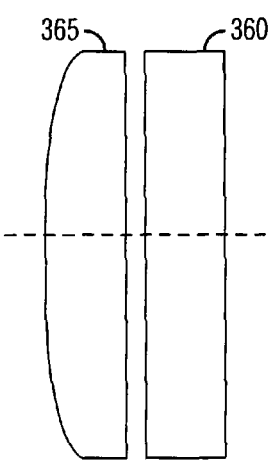
Figure 6G:
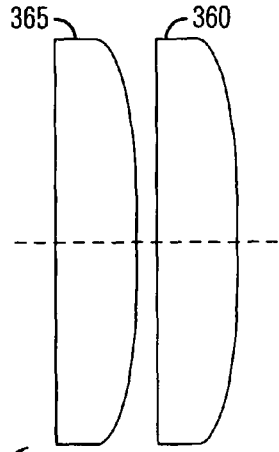
Figure 6H:
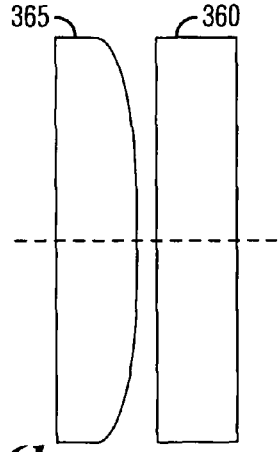
Figure 6I:
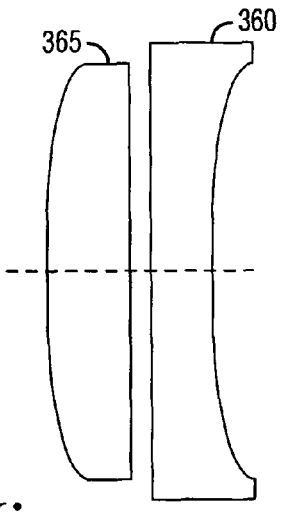
Figure 6J:
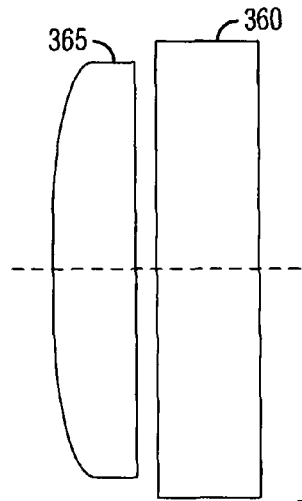
Figure 6K:
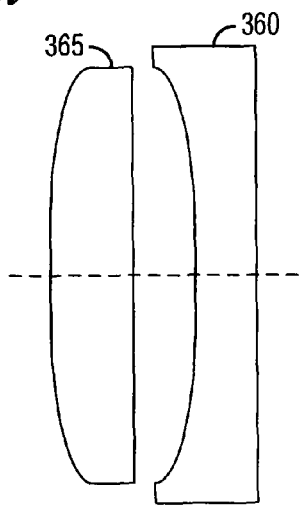
Figure 6L:
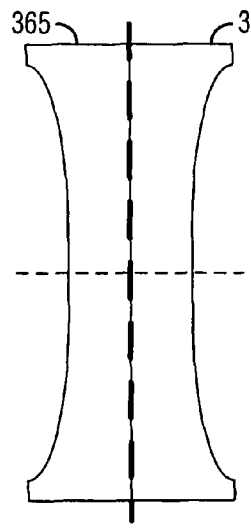
Figure 6M:
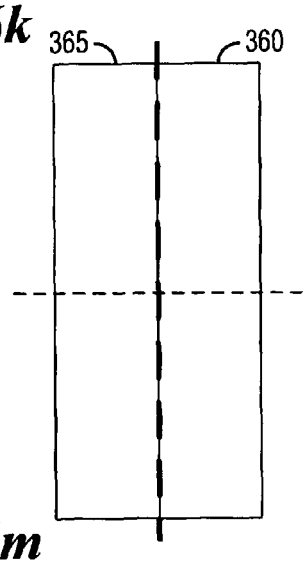
Figure 6N:
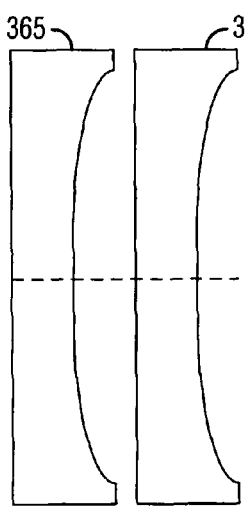

With reference now to FIGS. 6a through 6n, there are shown diagrams illustrating various embodiments of exemplary collimating layers 355, wherein the collimating layers 355 include the first Fresnel lens 360 and the second Fresnel lens 365. The second Fresnel lens 365 of the collimating layer 355 may be an aspheric lens (also commonly referred to as an aspherical lens) that has been flattened to produce a Fresnel lens. The curved surface of the aspheric lens may be oriented towards the viewing side of the collimating layer 355. The first Fresnel lens 360 may be a lens with power along a first axis and no power along a second axis, wherein the first axis and the second axis are orthogonal to the light path of the collimating layer 355. An example of such a lens may be a cylindrical lens. As with the second Fresnel lens 365, the first Fresnel lens 360 may be a flattened version of such a lens. There may be an air gap between the first Fresnel lens 360 and the second Fresnel lens 355. The diagram shown in FIG. 6a illustrates a side view of such an embodiment of the collimating layer 355 with the power of the first Fresnel lens 360 being along a vertical axis orthogonal to the light path. The diagram shown in FIG. 6b illustrates a top view of the same embodiment.

With certain lens configurations, it may be possible to attach the first Fresnel lens 360 to the second Fresnel lens 365 (using an adhesive with substantially the same index of refraction as the materials used for the lenses). Additionally, it may be possible to fabricate the first Fresnel lens 360 and the second Fresnel lens 365 as a single unit using a multi-step fabrication process. For example, the first Fresnel lens 360 may be extruded from an optical grade plastic or glass. The extrusion may be accomplished by pressing a material used to create the first Fresnel lens 360 through a die, wherein the die may have the proper configuration to produce the first Fresnel lens 360 with a desired cross-section. Then a material used to create the second Fresnel lens 365 may be deposited on a surface of the first Fresnel lens 365 and then be pressed (or molded) into a desired shape. For example, while the material used to create the second Fresnel lens 365 is in a plastic or pliable state, a mold having the desired profile and contour may be pressed onto the material. Once the material hardens, the mold may be removed, resulting in the second Fresnel lens 365 having the desired profile and contour. Alternatively, if the material used has sufficient elastic memory, the mold may be removed before the material completely hardens and the material may retain the desired profile and contour. The diagrams shown in FIGS. 6c and 6d illustrate side and top views of an embodiment of the collimating layer 355 comprising the first Fresnel lens 360 attached to the second Fresnel lens 365 either with an adhesive or manufactured as a single unit.

It may also be possible to modify the orientation of the curved (or grooved) surface of either of the Fresnel lenses used in the collimating layer 355. The diagrams shown in FIGS. 6e through 6h illustrate different orientations of the first Fresnel lens 360 and the second Fresnel lens 365. The curvature of the lens may also be varied. The lenses shown in FIGS. 6a through 6h are convex lenses. However, concave lenses may also be used. The diagrams shown in FIGS. 6i through 6n illustrate different embodiments of the lenses used in the collimating layer 355, wherein one or more of the lenses may have a convex curvature. Additionally, the lenses may be spherical lenses. The Fresnel lenses shown in FIGS. 6a and 6n are illustrated using their spherical (or aspherical) equivalents to simplify the drawings. The illustrations of only Fresnel lenses should not be construed as being limiting to either the scope or the spirit of the present invention, since non-Fresnel lenses may be used in place of the Fresnel lenses.

Figure 7:
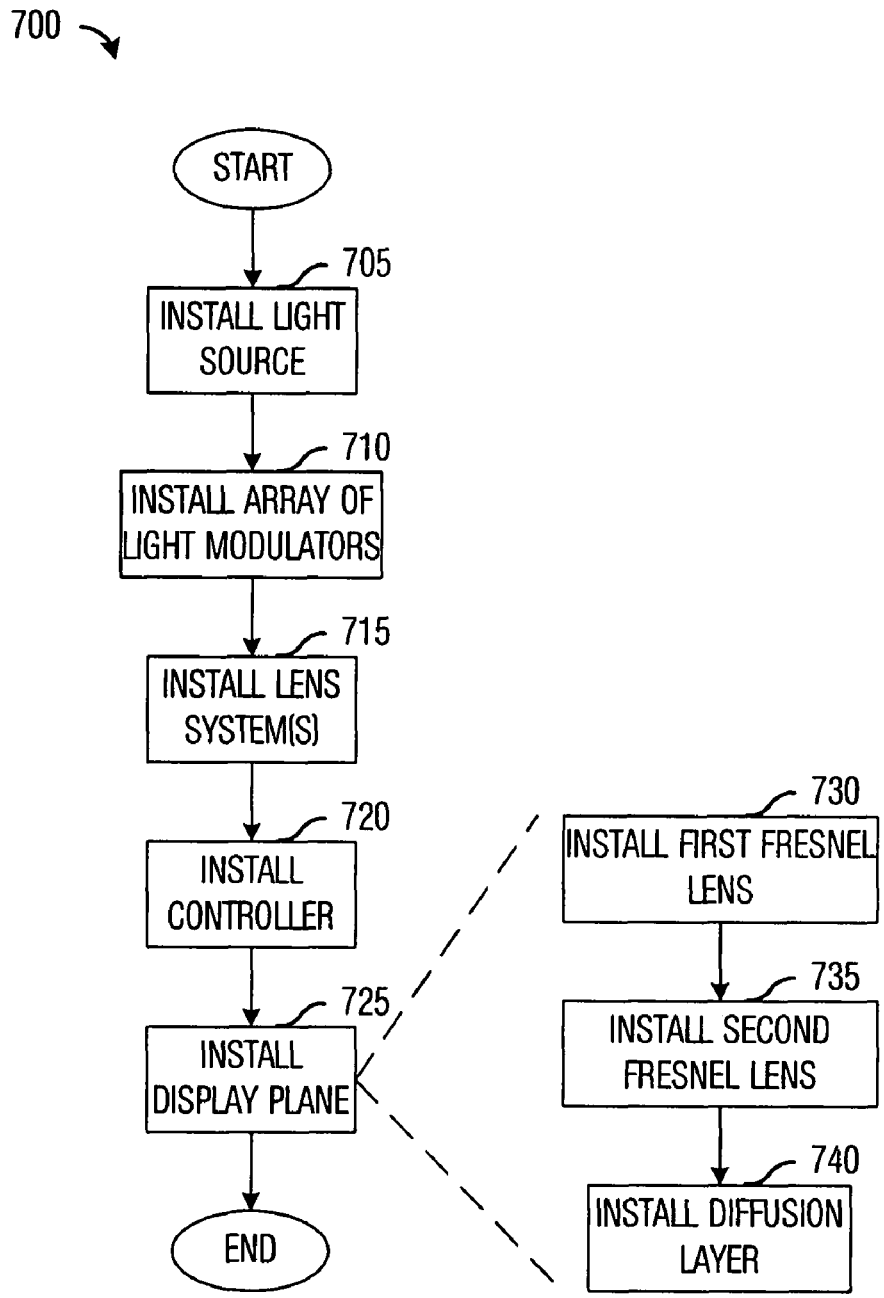
FIG. 7 is a diagram of a sequence of events in the manufacture of a microdisplay-based projection display system.

With reference now to FIG. 7, there is shown a diagram illustrating a sequence of events 700 in the manufacture of an exemplary microdisplay-based projection display system. The manufacture of the microdisplay-based projection display system may begin with installing a light source, which may produce multiple colors of light (block 705). The manufacture may continue with installing an array of modulators (a microdisplay), such as a DMD in the light path of the multiple colors of light produced by the light source (block 710). After installing the array of modulators, a lens system may be installed between the light source and the array of modulators (block 715). A controller for the microdisplay-based projection display system may then be installed (block 720).

With the controller installed, the manufacture may continue with installing a display plane (block 725). The installing of the display plane may include the installing of a first Fresnel lens (block 730) and then a second Fresnel lens (block 735). Alternatively, the first Fresnel lens and the second Fresnel lens may be combined into a single unit that may be installed in a single step. Then, a diffusion layer may be installed (block 740). In some embodiments, the sequence may be performed in a different order, or some of the steps may be performed at the same time.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claim(s) are intended to include within their scope such processes, machines, manufacture, compositions of matter, means, methods, or steps.

What is claimed is:

1. A display panel comprising:
    a cylindrical Fresnel lens defining a first axis in a direction of optical power, a second axis perpendicular to the first axis, and a third axis perpendicular to a panel of the cylindrical Fresnel lens, the first axis, and the second axis;
    an aspherical Fresnel lens having more power along the second axis than along the first axis; and
    a diffusion layer positioned to receive light passing through the first and second Fresnel lenses, the diffusion layer configured to increase a viewing angle of the display panel.

2. The display panel of claim 1, wherein the diffusion layer comprises a lenticular layer.

3. The display panel of claim 1, wherein the display panel is rectangular in shape with a first measurement along the first axis being less than a second measurement along the second axis.

4. The display panel of claim 1, wherein the cylindrical Fresnel lens and the aspherical Fresnel lens are bonded together to form a single physical lens.

5. The display panel of claim 1, wherein the aspherical Fresnel lens is molded over the cylindrical Fresnel lens.

6. The display panel of claim 1, wherein the cylindrical Fresnel lens is an extrusion.

7. A display system comprising:
    a light source to produce light;
    an array of light modulators optically coupled to the light source and positioned in a light path of the display system after the light source, the array of light modulators configured to produce images by modulating light from the light source based on image data;
    a display panel positioned in the light path of the display system after the array of light modulators, the display panel configured to display the images produced by the array of light modulators, the display panel comprising;
        a cylindrical Fresnel lens defining a first axis in a direction of optical power, a second axis perpendicular to the first axis, and a third axis perpendicular to a panel of the cylindrical Fresnel lens, the first axis, and the second axis;
        an aspherical Fresnel lens having more power along the second axis than along the first axis; and
        a diffusion layer positioned positioned to receive light passing through the first and second Fresnel lenses, the diffusion layer configured to increase a viewing angle of the display panel; and
    a controller electronically coupled to the array of light modulators and to the light source, the controller configured to load image data into the array of light modulators.

8. The display panel of claim 7, wherein the diffusion layer comprises a lenticular layer.

9. The display panel of claim 7, wherein the display panel is rectangular in shape with a first measurement along the first axis being less than a second measurement along the second axis.

10. The display panel of claim 7, wherein the cylindrical Fresnel lens and the aspherical Fresnel lens are bonded together to form a single physical lens.

11. The display panel of claim 7, wherein the aspherical Fresnel lens is molded over the cylindrical Fresnel lens.

12. The display panel of claim 7, wherein the cylindrical Fresnel lens is an extrusion.

13. The display system of claim 7, wherein the cylindrical Fresnel lens is tilted relative to the aspherical Fresnel lens such that light from the light source strikes the cylindrical Fresnel lens at an angle closer to a normal angle.

14. The display system of claim 7, wherein the array of light modulators comprises a digital micromirror device.

15. A method of manufacturing a display system, the method comprising:
    installing a light source configured to generate light;
    installing an array of light modulators in the light path;
    installing a controller configured to control the light source and the array of light modulators;
    installing a display panel in the light path, wherein installing the display panel comprises:
        installing a cylindrical Fresnel lens defining a first axis in a direction of optical power, a second axis perpendicular to the first axis, and a third axis perpendicular to a panel of the cylindrical Fresnel lens, the first axis, and the second axis;
        installing an aspherical Fresnel lens having more power along the second axis than along the first axis; and
        installing a diffusion layer positioned positioned to receive light passing through the first and second Fresnel lenses, the diffusion layer configured to increase a viewing angle of the display panel.

16. The method of claim 13 wherein the cylindrical Fresnel lens and the aspherical Fresnel lens are installed as a single lens unit.

17. The method of claim 15, wherein the cylindrical Fresnel lens and the aspherical Fresnel lens are bonded together to form a single physical lens.

18. The method of claim 15, wherein the aspherical Fresnel lens is formed with the use of a mold to shape a lens material in liquid form over the cylindrical Fresnel lens.

19. The method of claim 15, wherein the cylindrical Fresnel lens and the aspherical Fresnel lens are formed from materials selected from the group consisting of: plastic, glass, and combinations thereof.

20. The method of claim 15, wherein the cylindrica Fresnel lens is formed by extrusion.

* * * * *